United States Patent [19]
Schaschel

[11] 3,907,750
[45] Sept. 23, 1975

[54] REACTION PRODUCTS OF SILICON MONOXIDE AND OLEFINS AND METHODS OF MAKING THE SAME
[75] Inventor: Erich T. Schaschel, Toledo, Ohio
[73] Assignee: Owens-Illinois, Inc., Toledo, Ohio
[22] Filed: July 19, 1971
[21] Appl. No.: 164,065

Related U.S. Application Data
[63] Continuation of Ser. No. 16,269, March 3, 1970, abandoned.

[52] U.S. Cl. ......... 260/46.5 R; 260/2 S; 260/37 SB; 260/94.9 R; 260/448.2 D; 260/448.2 E; 260/825
[51] Int. Cl.² ........................................ C08G 77/04
[58] Field of Search .............. 260/94.9, 2 S, 46.5 R, 260/448.2 E, 448.2 D

[56] References Cited
UNITED STATES PATENTS
3,624,014   11/1971   Moore et al. ...................... 260/18 S Primary Examiner—Melvyn I. Marquis
Attorney, Agent, or Firm—Richard D. Heberling; E. J. Holler

[57] ABSTRACT

Organo silicon polymers are prepared by the reaction of silicon monoxide and an olefine such as cyclohexene to provide a polymer that is useful as a lubricant, stop-cock grease and as a filler for ceramic and plastic compositions.

16 Claims, No Drawings

REACTION PRODUCTS OF SILICON MONOXIDE AND OLEFINS AND METHODS OF MAKING THE SAME

This is a continuation of application Ser. No. 16,269 filed Mar. 3, 1970, and now abandoned.

THE INVENTION:

The present invention relates to the reaction products of silicon monoxide and an olefine (or olefin) and to methods for preparing said reaction products.

It is an object of the present invention to provide a new reaction product by reacting gaseous silicon monoxide in a vacuum with an olefine to provide a reaction product that is an organo silicon polymer having a molecular chain with (—Si—O—Si—) units.

It is an object of the present invention to provide a reaction product of silicon monoxide and an olefine such as propene or 1-pentene and methods of preparing the same.

These and other objects will be apparent from the specification that follows and the appended claims.

The present invention provides a reaction product of silicon monoxide and an olefine such as propene, 1-pentene and cyclohexene.

The present invention also provides methods of preparing organo silicon polymers by mixing gaseous silicon monoxide provided by heating solid silicon monoxide to about 1200° to 1300°C. in a chamber under a vacuum generally between $1 \times 10^{-6}$ to $1 \times 10^{-2}$ Torr and preferably between 1 to $5 \times 10^{-5}$ Torr with an olefine to form a mixture and condensing the mixture to provide a reaction product which can be, for instance, deposited on the cooled surface of a rotatable cylinder within the chamber. Generally the molar ratio of olefine to silicon monoxide is in the range of 1.5:1 to 120:1 and preferably about 5:1 to 60:1. The reaction of silicon monoxide with olefines apparently takes place on the cooled surface at a temperature generally of about −196° to +100°C. and preferably about −196° to −70°C. A large excess molar amount of olefine promotes the addition reaction rather than the polymerization of SiO itself.

The present invention provides a method of preparing an organo silicon polymer comprising the steps of mixing 1 mole of gaseous silicon monoxide and about 1.5 to 120 moles of a monoolefin in a vacuum having a pressure of about $1 \times 10^{-6}$ to $1 \times 10^{-2}$ Torr to form a mixture, and condensing the mixture at about −196° to 100°C. to provide the organo silicon polymer that is the reaction product of silicon monoxide and the mono-olefin.

The present invention provides a reaction product of one mole of silicon monoxide and about 1.5 to 120 moles of a mono-olefin, the silicon monoxide and mono-olefin being mixed at a pressure of about $1 \times 10^{-6}$ to $1 \times 10^{-2}$ Torr to form a mixture that is condensed at about −196° to 100°C. to provide the reaction product.

In general, the polymeric condensate is a solid, infusible material that is either insoluble in organic solvents or soluble in solvents such as benzene, acetone, dioxane, dimethyl formamide, etc. The polymer has a high surface area and is hygroscopic. The polymer has good high temperature resistant properties. Thus, in general, the products are solid and infusible (they decompose very slowly and gradually at higher temperatures such as those above about 400° to 450°C.).

In accordance with the present invention, the average unit formula for the reaction product is approximately as follows:

SiO + propene: $C_3H_6$ $(SiO)_3$
SiO + 1-pentene: $C_5H_{10}$ $(SiO)_{1.6}$
SiO + cyclohexene: $C_6H_{12}$ $(SiO)_3$ Infrared spectroscopy and hydrolytical decomposition data show that as an initial step addition of SiO to the olefinic double bond occurs approximately as follows:

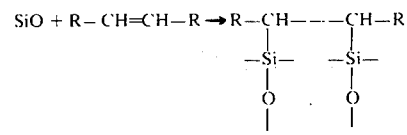

where R is preferably an alkyl group as hereinafter described.

The addition reaction of SiO to the double bonds shown above is in competition with a polymerization of SiO itself. The transfer of mono-coordinated silicon in the monomeric silicon monoxide to tetra-coordinated silicon in the reaction product is responsible for the generally highly cross-linked structure. The resultant organo silicon polymer usually contains Si—O—Si bonds as well as, sometimes, Si—Si bonds.

Silicon monoxide can be obtained commercially (as, for instance, from Union Carbide Corp.) and can be prepared by reducing $SiO_2$ with Si, SiC, C, $H_2$, etc. at generally a high temperature. The reduction of $SiO_2$ with Si provides maximum yield and this process is generally preferred for preparing the silicon monoxide, this process being characterized by its high reaction velocity and absence of secondary reactions that might possibly contaminate the final product. A detailed discussion of the nature and thermodynamic properties of solid silicon monoxide can be found in a monograph by N.A. Toropov, V.P. Barzakowskii, High Temp. Chemistry of Silicates and Other Oxide Systems, Izd. AN SSSR, Moscow, 1963. The disclosure of this publication is hereby incorporated by reference. The preparation of silicon monoxide is also disclosed in U.S. Pat. Nos. 2,882,177 and 2,823,979 which are also incorporated by reference.

Preferred olefines are propene, 1- or 2-butene, 1-pentene, and cyclohexene. Other suitable olefines are those having the general formula: R—CH=CH—R where R is hydrogen, the same or different aliphatic group preferably having 1 to 12 carbon atoms including alkyl groups such as methyl, ethyl, propyl, butyl, hexyl, octyl and decyl and an aromatic group such as phenyl and naphtyl preferably having 6 to 12 carbon atoms. Suitable specific examples are hexene, octene, decene, styrene, stilbene and vinyl naphthylene. In the formula, R also can include other groups such as halides, —COOR, —COOH, —OH, —OR, etc. While there may be, in some cases, competing reaction due to these groups, there is a reaction between the sublimed silicon monoxide and the double bond of the organic compound in accordance with this invention.

The following examples are intended to illustrate the present invention and are not intended to limit the same in any way.

EXAMPLE 1

Cyclohexene was reacted with silicon monoxide using a rotatable cylinder within a chamber under high vacuum. The rotatable cylinder cooled with liquid nitrogen serves as a quenching trap. The silicon monoxide was prepared by heating commercial SiO to about 1200° to 1300°C. at a pressure of about 1 to 5 × 10$^{-5}$ Torr and the gaseous silicon monoxide resulting therefrom was quenched onto the cooled surface with a large excess of organic reactant (the molar ratio of silicon monoxide to cyclohexene being 1:50). On warming to room temperature, the excess of unreacted cyclohexene was pumped off and the reaction product, an amber solid with a molecular formula of $C_6H_{12}(SiO)_3$ was recovered. The product was insoluble in organic solvents and infusible. The yield based on silicon monoxide condensed onto the cold trap was 100%. The reaction product was useful as a stop-cock grease, and as a filler in ceramic and in organopolysiloxane compositions. It was used as a filler in an organopolysiloxane molding composition using 5 parts by weight of the filler per 100 parts by weight of the organopolysiloxane.

EXAMPLE 2

Trans-stilbene was reacted with silicon monoxide at a molar ratio of 10 moles trans-stilbene to 1 mole silicon monoxide using the methods described in Example 1. The solid recovered from the cooled cylinder wall contained an excess of unreacted stilbene which was extracted with n-hexane. The reaction product which was a polymer was placed in dimethyl formamide and 20% of the reaction product dissolved therein. From the solution in dimethyl formamide, a low molecular weight polysiloxane with a 1:1 addition ratio of silicon monoxide to stilbene was isolated. The product is a brown, infusible solid. The insoluble residue was also infusible and showed a silicon monoxide to stilbene ratio between about 1:1 and about 2:1.

In the above examples, other olefines having a double bond such as 1-pentene and propene can be substituted in whole or part for the cyclohexene or the trans-stilbene to provide substantially equivalent results.

What is claimed is:

1. An organo silicon polymer having a molecular chain with (—Si—O—Si—) units prepared by the reaction of one mole of silicon monoxide and about 5 to 60 moles of a mono-olefin, the polymer being the reaction product of a mixture of gaseous silicon monoxide and gaseous mono-olefin at a pressure of about $1 \times 10^{-6}$ to $1 \times 10^{-2}$ Torr and condensing the mixture at about −196° to −70°C., the gaseous silicon monoxide being formed by heating solid silicon monoxide to about 1200°–1300°C.

2. A method of preparing an organo silicon polymer comprising the steps of mixing one mole of gaseous silicon monoxide and about 1.5 to 120 moles of a mono-olefin in a vacuum having a pressure of about $1 \times 10^{-6}$ to $1 \times 10^{-2}$ Torr to form a mixture, and condensing the mixture at about −196° to 100°C. to provide the organo silicon polymer that is the reaction product of silicon monoxide and the mono-olefin.

3. A polymer as defined in claim 1 in which the olefin is propene.

4. A polymer as defined in claim 1 in which the olefin is trans-stilbene.

5. A method as defined in claim 2 in which the olefin is cyclohexene.

6. A method as defined in claim 2 in which the olefin is propene.

7. A method for preparing an organo silicon polymer comprising the steps of heating solid silicon monoxide to about 1200°–1300°C. in a high vacuum to form gaseous silicon monoxide, mixing one mole of gaseous silicon monoxide at a pressure of about $1 \times 10^{-6}$ to $1 \times 10^{-2}$ Torr with about 1.5 to 120 moles of a gaseous mono-olefin to form a mixture, and condensing the mixture at a temperature of about −196° to 100°C. to provide the organo silicon polymer, the mono-olefin having the general formula R—CH=CH—R where R is a member of the group consisting of aliphatic groups having 1 to 12 carbon atoms, an aromatic group having 6 to 12 carbon atoms and hydrogen.

8. A method as defined in claim 7 in which the mixing is at a pressure of about $1 \times 10^{-5}$ to $5 \times 10^{-5}$ Torr and about 50 moles of the mono-olefin is used.

9. A method as defined in claim 7 in which the molar ratio of olefin to silicon monoxide is about 5:1 to 60:1.

10. A method as defined in claim 2 in which the olefin is cyclohexene and the molar ratio of cyclohexene to silicon monoxide is about 50:1.

11. A method as defined in claim 7 in which the ratio of olefin to silicon monoxide is about 10:1 and the olefin is trans-stilbene.

12. A method as defined in claim 7 in which the pressure is about $1 \times 10^{-5}$ to $5 \times 10^{-5}$ Torr.

13. A method as defined in claim 12 in which the condensing of the mixture is at a temperature of about −196° to −70°C.

14. A method of preparing an organo silicon polymer comprising the steps of heating solid silicon monoxide to about 1200° to 1300°C. in a high vacuum to form gaseous silicon monoxide, mixing one mole of the gaseous silicon monoxide and about 5 to 60 moles of a gaseous mono-olefin at a pressure of about $1 \times 10^{-5}$ to $5 \times 10^{-5}$ Torr to form a mixture, the mono-olefin having the general formula R—CH=CH—R where R is an aliphatic group of 1 to 12 carbon atoms, and condensing the mixture at about −196° to 100°C. to obtain the organo silicon polymer having a molecular chain containing (-Si-O-Si-) units.

15. A method as defined in claim 14 in which the olefin is trans-stilbene.

16. A method as defined in claim 14 in which the olefin is propene.

* * * * *